July 1, 1947.   W. FIORE ET AL   2,423,091
CONTACT RECTIFIER
Filed Oct. 3, 1942
FIG.1.
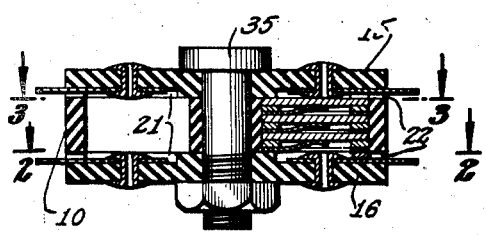
FIG.4.
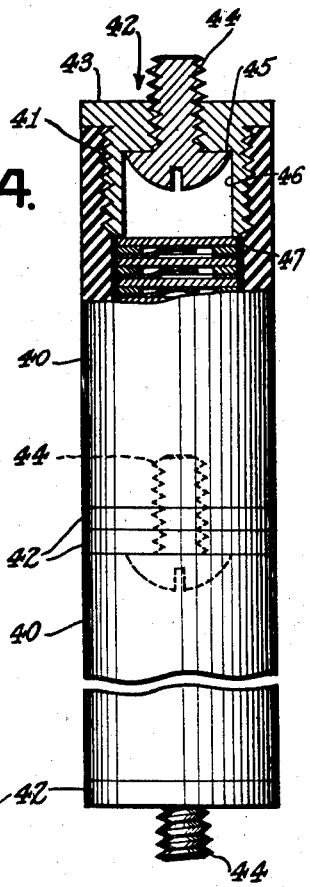
FIG.6.
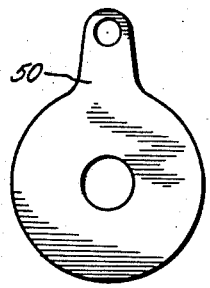
FIG.2.
FIG.7.
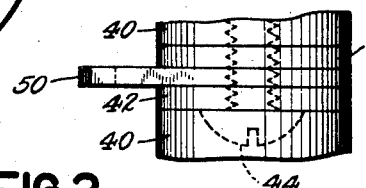
FIG.3.
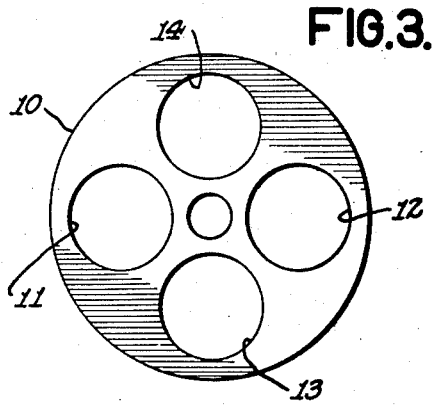
FIG.5.
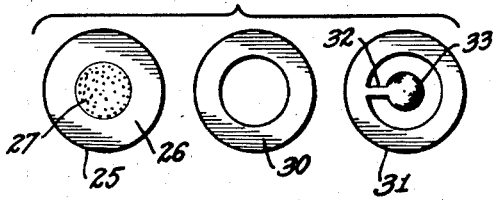
INVENTORS
William Fiore
Chester A. Kotterman
BY
James N. Curtin
ATTORNEY Patented July 1, 1947

2,423,091

UNITED STATES PATENT OFFICE 2,423,091

CONTACT RECTIFIER

William Fiore, Brooklyn, N. Y., and Chester A. Kotterman, Livingston, N. J., assignors to Federal Telephone and Radio Corporation, a corporation of Delaware Application October 3, 1942, Serial No. 460,600

7 Claims. (Cl. 175—366)

This invention relates to electric rectifiers of the contact type, and more particularly to rectifiers of the kind where a plurality of rectifier units are assembled in a stack. When rectifier elements are so assembled, a certain amount of pressure is necessary to maintain proper contact between the parts. Sometimes, due to any of a number of causes, the pressure of individual contact members on the electrodes, particularly on counter-electrodes, has resulted in injury to the electrode coating. An object of the present invention therefore is to provide a rectifier assembly wherein the pressure exerted on a stack of rectifier elements is not directly communicated to the respective counter electrodes after the elements in the stack have once been pressed together, a novel contact member being provided for each counter electrode which maintains contact therewith by means of a yielding tongue.

Another object of the invention is to provide means for easily connecting a plurality of rectifier elements together.

Other objects will appear in the following description given with the aid of the accompanying drawings, of which Fig. 1 shows in section a first modification of the invention, the section being taken through 1—1 of Fig. 2;

Figs. 2 and 3 are sections taken through 2—2 and 3—3 of Fig. 1;

Fig. 4 shows in elevation and partly in section a second modification of the invention;

Fig. 5 shows three circular members forming part of the rectifier apparatus;

Figs. 6 and 7 show respectively a connecting lug, and a connecting lug positioned between two rectifier elements.

The invention is shown considerably enlarged in the drawings for the sake of clearness.

Referring now to the drawings. Figs. 1, 2 and 3 show a receptacle for rectifier plates which comprises a disc-shaped body member 10, Fig. 3, through which extend circular openings 11, 12, 13, and 14. The upper and lower surfaces of member 10 are provided with detachable cover plates 15, and 16, and in the cover plate are four metal eyelets 17, 18, 19 and 20 disposed in spaced relation so that an eyelet overlies each end of an opening 11 to 14 when the covers are in place. Around each eyelet a circular depression is formed having a narrow channel 22 extending to the edge of the cover plate into which fits, substantially flush with the surface of the cover plates, a connecting lug 23 secured in place by the associated eyelet. The four separate receptacles formed as just described are each for the purpose of retaining an assembly of rectifier plates of novel construciton now about to be described.

Referring to Fig. 5, disc 25 is a rectifier electrode of a suitable metal, for example, steel, of such size as to fit into an opening 11 to 14. One side of disc 25 is uncoated and makes contact with an eyelet. The other side 26 is suitably coated by a rectifying coating, such as a form of selenium, on which is a counter electrode 27.

A washer of insulating material, such as fiber, is indicated by reference character 30.

A contact member of springy metal, such as brass is indicated by reference character 31. This washer-shaped member has an inwardly extending tongue 32 provided with an enlarged dished contact portion 33, the tongue and the contact portion being bent out of the plane of the periphery of the contact member for contact pressure purposes.

The rectifier members are assembled in the respective openings 11 to 14 as shown in Fig. 1. First a rectifier disc 25 is placed in an opening with its uncoated surface in contact with an eyelet 17 to 20. An insulating washer 30 is then placed on top of the coated surface 26 of the disc and on top of the washer a contact member is placed with its central contact portion 32 in yielding engagement with the counter electrode 27. This forms a complete rectifier section, to which additional sections may be added in series by placing another rectifier disc on top of contact member 31 with its uncoated surface against the contact member, an insulating washer next, and then a second contact member is placed on top of the washer with its center contact member engaging counter electrode 27 of the second disc, and so on until the required number of sections fills the opening therefor which is proportioned for a given number of rectifier components, so the assembly will terminate with a contact member 33 which will make contact with the eyelet and connecting lug either directly or through a metal washer when the second cover plate is in position. With the arrangement just described, when the covers are fastened to the body portion by any suitable means, such as bolt 35, the parts are securely held in position and individual uniform spring pressure is exerted on each counter electrode by tongue 32 and the center contact 33 of the associated contact member 31. No injurious pressure can be exerted on the counter electrodes because pressure exerted by the cover plates on the respective piles of the rectifier elements is taken up by the insulating washers 30. The thickness of the insulating washer 30 and the amount the tongue of part 31 is bent out of the plane of the periphery of the washer determines the pressure the convex surface 33 exerts on the counter-electrode 27. Another advantage in the use of the insulating washer as described is that it prevents the possibility of short circuits which would occur if minute metal points from the base should protrude through the selenium. If any such point should protrude and the fiber washer were not present, they would make a short circuit in contact with the brass ring of the contact member 31.

It will be understood that the polarity of each assembly of rectifier components may be arranged in respect to the terminal lugs to suit particular circuit requirements.

A modification of the invention is shown in Fig. 4. This arrangement consists of a tube 40 of insulating material having a bore in which the rectifier components just described may be placed. The tube is threaded at each end to receive the threaded part 41 of metal cap members 42, having a flat surface 43, and an axially disposed threaded opening for a machine screw 44, the head 45 of which abuts the end of a co-axial recess 46 formed in the cap member. In Fig. 4 there are illustrated a pair of tubes joined end to end by the screw 44 shown in dotted lines.

This illustrates how any number of these tubes may be joined end to end by screws 44 connecting adjacent ends 42 of respective tubes 40. In such an arrangement the polarities of the adjacent rectifier tubes may be arranged in any desired manner, and if desired, connecting lugs such as 50 may be placed between adjacent members 42. In this way any number of tubes joined end to end may be connected in a well known manner for a half wave or a full wave bridge connection.

The rectifier components are assembled in tube 40 in the manner already described, the uncoated surface of the iron disc 25 resting on the edge 47 of the cap member and the other members following in order.

The embodiment shown in Fig. 4 has the advantage that the rectifier discs are completely protected against dust and moisture. Furthermore the novel cap and associated machine screw makes it easy to attach one or more rectifier units or combinations thereof to existing circuits or apparatus. The position of screws 44 may be reversed from that shown in Fig. 4 for the purpose of attaching lugs at the ends of the device or for attaching the rectifier to a supporting device. Recess 46 is sufficiently deep to permit the screws to be used in either position.

As in the previous embodiment the rectifier components are clamped between contact members at opposite ends of the receptacle which in this instance are cap members 42. When the peripheral part of contact member 31 is once pressed flat between the surface of the insulating washer and the uncoated surface of the adjacent disc 25, further pressure on these parts does not change the pressure exerted by tongue 32 and the central contact portion 33 of the respective contact members on the associated counter electrodes 27.

What is claimed is:

1. A rectifier comprising a stack of rectifier components including a plurality of flat electrode members having one surface uncoated and the other coated with a rectifying material, a contact member disposed between the respective electrode members for making contact with the rectifying material on one plate and the uncoated surface of the adjacent plate, said contact members being each provided with a yielding inner portion for making contact with the coated surface of one plate and an outer portion for making contact with the uncoated surface of the adjacent plate and means for insulating said outer portion from the coated surface of the first mentioned plate.

2. A rectifier comprising a stack of rectifier components including a plurality of flat electrode members having one surface coated with a rectifying material and the other uncoated, contact members alternately disposed between said electrode members in said stack, each contact member comprising an outer portion adapted to engage the outer part of the uncoated surface of an electrode member and a yielding contact portion for engaging the coated surface of the adjacent electrode near the midpoint thereof and an insulating member disposed between said outer portion of said contact member and the adjacent coated electrode surface for holding the outer portion of said contact member in spaced relation therewith.

3. A rectifier comprising a stack of rectifier components having one surface coated with a rectifying material and the other uncoated, contact members alternately disposed between said electrode members in said stack, each contact member comprising an outer portion adapted to engage the outer part of the uncoated surface of an electrode member and a yielding contact portion for engaging the coated surface of the adjacent electrode at approximately the central portion thereof, an insulating member disposed between said outer portion of said contact member and said coated surface of the adjacent electrode and holding said contact member in spaced relation therewith whereby pressure on said stack is taken up by said insulating members thus preventing injurious stresses from reaching the central areas of said coated surfaces.

4. A rectifier structure comprising a tube of insulating material, metal caps each having an axially disposed threaded opening screwed on opposite ends of said tube, a tubular portion of said caps open-ended for receiving a threaded screw head and having portions extending into the bore of said tube, outside threads on said tubular portion, and an assembly of rectifier components in said tube secured by and between the extended tubular portions of said caps.

5. A rectifier structure according to claim 4 comprising means for assembling a plurality of said tubes in a single multiple rectifier structure comprising screw members in said axially disposed threaded openings.

6. A rectifier structure according to claim 4 in which said rectifier components comprise a plurality of circular metal discs, each coated on one side with a rectifying material, a counter electrode on the central area of each coating, a spacing washer of insulating material resting on each coating, contact members for inter-connecting adjacent discs, disposed on each spacing washer, said contact members each comprising a metal washer-shaped ring, a tongue formed on the inner edge of said ring, a contact at the end of said tongue held by spring tension of said tongue against said counter electrode, said washer-shaped ring at its periphery making contact with the uncoated surface of the adjacent metal disc, the arrangement being such that pressure exerted by said caps on said components is taken up by the respective spacing washers whereby no injurious strain is imparted to the respective counter-electrode.

7. A rectifier structure comprising a stack of rectifier components made of a plurality of circular metal discs, each coated on one side with a rectifying material, a counter electrode on the central area of each coating, a spacing washer of insulating material resting on each coating, around the central area, contact members for inter-connecting adjacent discs, disposed on each spacing washer, said contact members each comprising a metal washer-shaped ring, a tongue formed on the inner edge of said ring, a contact at the end of said tongue held by spring tension of said tongue against said counter electrode, said washer shaped ring at its periphery making contact with the uncoated surface of the adjacent metal disc, the arrangement being such that pressure exerted by said caps on said components is taken up by the respective spacing washers whereby no injurious strain is imparted to the respective counter-electrode.

WILLIAM FIORE.
CHESTER A. KOTTERMAN.

REFERENCES CITED

The following references are of record in the file of this patent:

UNITED STATES PATENTS

| Number | Name | Date |
|---|---|---|
| 1,585,991 | Ile | May 25, 1926 |
| 2,158,851 | Ceader | May 16, 1939 |
| 1,382,440 | Recker | June 21, 1921 |
| 2,254,474 | Diebel | Sept. 2, 1941 |
| 1,833,332 | Peter | Nov. 24, 1931 |
| 2,221,616 | Smith | Nov. 12, 1940 |
| 701,253 | Bennett | May 27, 1902 |
| 785,205 | Graves | Apr. 26, 1904 |
| 1,908,800 | Utne | May 16, 1933 |
| 2,042,542 | Masnou | June 2, 1936 |